United States Patent [19]
Frese, II et al.

[11] Patent Number: 5,909,545
[45] Date of Patent: Jun. 1, 1999

[54] METHOD AND SYSTEM FOR ON DEMAND DOWNLOADING OF MODULE TO ENABLE REMOTE CONTROL OF AN APPLICATION PROGRAM OVER A NETWORK

[75] Inventors: Vincent Frese, II, Woodstock; W. Brian Blevins, Canton, both of Ga.

[73] Assignee: Tridia Corporation, Atlanta, Ga.

[21] Appl. No.: 08/589,136

[22] Filed: Jan. 19, 1996

[51] Int. Cl.$^6$ ............................................. G06F 15/136
[52] U.S. Cl. ........................... 395/200.38; 395/200.32
[58] Field of Search .................... 395/200.32, 200.34, 395/200.35, 684, 200.38; 707/500, 501, 526

[56] References Cited

U.S. PATENT DOCUMENTS

| | | | |
|---|---|---|---|
| 5,280,583 | 1/1994 | Nakayama et al. | 395/200.35 |
| 5,315,711 | 5/1994 | Barone et al. | 395/20.38 |
| 5,347,632 | 9/1994 | Filepp et al. | 395/200.32 |
| 5,379,374 | 1/1995 | Ishizaki et al. | 395/200.33 |
| 5,392,400 | 2/1995 | Berkowitz et al. | 395/200.33 |
| 5,491,791 | 2/1996 | Glowny et al. | 395/183.13 |
| 5,530,795 | 6/1996 | Wan | 395/200.35 |
| 5,537,548 | 7/1996 | Fin et al. | 395/682 |

OTHER PUBLICATIONS

X Over the Web, Daniel Dandailler, *The X Resource*, Issue 15.

Levitt, Jason "Building apps with Navigator," Information Week, Nov. 6 1995, n552 p88(4): CD. Computer Select 1995.

*Primary Examiner*—Dung C. Dinh
*Attorney, Agent, or Firm*—Morris, Manning & Martin, L.L.P.

[57] ABSTRACT

The system and method is disclosed for remotely controlling an application program over a network. The system includes an application interception module and remote display module. The remote display module is transported across the network and executed on the user system in response to a user's request to provide on-demand remote control of an application program. The application interception module captures an I/O stream generated by an application program, converts it to remote control protocol messages and transports them across a network to the remote display module executing in the user system. The remote display module converts the remote control protocol messages to system calls compatible with the operating system environment for the users computer. Likewise, the remote display module converts system calls to the local resource interface in the user's computer to remote control protocol messages which are transported across the network to the application interception module. The application interception module interface converts the remote control protocol messages to system calls for the application program. In this manner, output from the application program is provided to the user's computer and input actions at the user's computer are provided to the application program. Preferably, the remote display modules and application programs are presented through HTTP servers over a network to a user's system which uses a browser having a JAVA interpreter to execute the remote display module and convert the remote control protocol messages.

18 Claims, 4 Drawing Sheets

METHOD AND SYSTEM FOR ON DEMAND DOWNLOADING OF MODULE TO ENABLE REMOTE CONTROL OF AN APPLICATION PROGRAM OVER A NETWORK

FIELD OF THE INVENTION

This invention relates to remote execution of computer programs and, more particularly, to remote execution of computer programs over a network.

BACKGROUND OF THE INVENTION

Selling computer software for home and business applications is a major market. In the retail market, competition is fierce in getting a program, sometimes called titles, before a consumer to be considered in the purchasing decision. Shelf space for new titles is extremely limited and every title for every publisher simply cannot be displayed. Consequently, software publishers look for other channels that can be used to get titles before consumers.

One of the other channels used by software publishers or manufacturers is direct advertising in computer publications. Another channel is direct marketing to potential consumers of computer software. However, accurate information about the programs is difficult to obtain through these channels. For example, the advertising copy may concentrate on the features provided by the software and, because space is limited, not disclose all the hardware and support software required for executing the advertised program. A review of the program requirements when the user orders the software or views its packaging at a retail outlet may form an impression within the consumer that the manufacturer's advertising was merely hype. This, in turn, may lead the consumer to view advertising information for all software products with a measure of skepticism.

In an effort to fully inform the potential purchaser about the program being offered, some manufacturers offer demonstration versions of their products. These demonstration versions may contain prepared examples of the capabilities of the offered software or they may contain a fully operational version with a time deactivation feature. The time deactivation feature permits the program to execute for only a limited time following its installation. In this manner, the consumer is able to test all of the features of the software, the ease in which the consumer can use the software, and the compatibility of the output of the software with other application programs which the consumer uses on their system. To disable the time deactivation feature, the consumer must purchase the software to obtain the commands for disabling the time deactivation feature or to receive a copy of the software without the time deactivation feature.

While demonstration software more fully informs consumers about the capability and user friendliness of the software, it does suffer from an important limitation—timelines. Many consumers are more likely to make a purchasing decision favorable to the seller if they are presented the product when the consumer's interest is active. If the demonstration version of the program is shipped on a diskette, the consumer may be busy when it arrives and simply never attempt to install the demonstration version for evaluation. Additionally, the consumer may have become aware of another software product or forthcoming development which the consumer thinks better addresses the consumer's need. Thus, the opportunity to favorably impress a consumer may have evaporated by the time the demonstration software has been placed in the hands of the consumer.

To make software available more quickly, some manufacturers have made their demonstration software available through downloading facilities. To obtain a copy of the software, the consumer's computer system communicates with the download facility so that a copy of the program may be transferred through a modem and over a telephone line to a modem associated with the consumer's system. While this approach reduces the time between the consumer's request for the software and its delivery, it still requires the consumer to contact the download facility for a copy of the program in response to advertising in a publication. Since the consumer's computer may not be accessible at the time that the publication is read, the consumer's interest may wane before she uses her computer system again.

A promising environment which appears to address many of the timing problems for the marketing of software is the Internet. The Internet is a publicly available network of computer networks that spans, not only the United States, but many parts of the world as well. To access the information on the Internet, a user uses a computer coupled to the Internet through an Internet server. These servers include programs which support the physical, data link, network and transport layers necessary for communication among the servers on the Internet. In this way, computers on a network associated with one server may communicate with a computer associated with another server and the messages between the computers may be relayed by intervening servers.

The importance of the Internet as a commercial marketplace was enhanced by the development of the Hypertext Transport Protocol (HTTP). This protocol is implemented with the Hypertext Markup Language (HTML). By using HTTP, documents written in HTML containing images and text may be presented on a server coupled to the Internet. The presented documents may then be retrieved and their contents graphically displayed. To peruse the HTML documents available through the servers of the Internet, a user's computer uses an application program called a browser. The browser communicates with servers using HTML and HTTP to request, retrieve, and display HTML documents on a user's computer. Such browsers may also retrieve a HTML document for storage on a user's system. Thus, a server on the Internet may present information about a software program in a graphical manner that is as impressive as any print ad and also support a download of the program to the user's system in response to a user's request for a demonstration program. Thus, the viewing of the information that raises a user's interest in a program is contemporaneous with the user's receipt of the program.

While the Internet, HTTP and HTML provide a commercially viable marketplace for software advertising and product demonstration, there are still limitations that restrain the effectiveness of this type of marketing once the consumer leaves the manufacturer's server site with the demonstration product. For one, the consumer must still install the demonstration product on the consumer's computer system. To do this, the consumer must still be knowledgeable about the hardware and software for his computer system to respond to the information prompts generated by the installation program for the demonstration product. This information includes knowledge about system memory, operating system version, monitor display size and video capability. As a result, the consumer may not be able to install the demonstration program properly and the program may abort its execution as a result. Just as unproductive, the consumer may become so frustrated during the installation procedure that he simply postpones the activation of the program and there is no way of ensuring the consumer later activates the program for the demonstration. Even if the consumer installs the program with relative ease, the consumer's unfamiliarity with the capabilities of the demonstrated program may lead the user to improperly evaluate the program. All of these possibilities negatively impact the likelihood that a consumer will make a decision to purchase the software.

One way to overcome the limitations still present in the Internet environment is to provide the user with access to the application program without requiring the user to execute the program in her own computer system. Allowing a user to remotely control an application on another computer coupled through a network is known in the software support and maintenance environment. Such remote control permits a technician located at a customer service site to execute the application program on a customer's computer from a remote location to try and duplicate the problem the customer is experiencing or to examine certain parameters in the program to ascertain resource problems which may be causing the customer's problems. Normally, the remote access to the customer's computer is through a modem and telephone line. That is, the communication is from one point, the service site, to the other point, the customer's computer. Other remote control programs may control an application executing on another computer over a network. One example of a protocol which supports such remote control over a network is the X protocol. In this type of control, communication between the controlling and controlled computers is not necessarily point to point.

Remote control programs, both network and point-to-point which are currently known, require a component of the remote control program to be resident on both computers. That is, the components necessary to support remote control must be installed on both computers prior to any attempt to control one of the computers remotely. Installation of the program to support remote control requires a consumer knowledgeable about her system parameters or a technician of the service company who possesses the requisite knowledge. The system parameters and local resources include the input/output (I/O) components of the system which, along with the corresponding support software, form the user interface to the computer system. These resources include a mouse, keyboard, monitor and communication ports.

What is needed is a remote control program that does not require pre-installation in order to operate.

What is needed is a way to provide potential customers with on-demand access to an application program without requiring the user to download and install the program on the user's system.

What is needed is a way to use the Internet or other network to transparently provide demonstration software.

SUMMARY OF THE INVENTION

The limitations of previously known systems have been overcome by a system and method performed in accordance with the principles of the present invention. The system includes an application interception module (AIM) for converting between a first input/output (I/O) stream protocol used by an application program and a first remote control protocol, the I/O stream protocol being used to interface the application program to local resources on a first computer; and a remote display module for converting between the first remote control protocol and a second I/O stream protocol said second I/O stream protocol for communicating with local resources for a second computer through a user interface, the remote display module being transported from the first computer to the second computer for execution by the second computer upon receipt whereby a user at the second computer may establish on-demand remote control of the application program on the first computer to provide input to and view output from the application program at the first computer.

The method of the present invention includes the steps of transporting a remote display module from a first computer to a second computer, executing the remote display module at the second computer to establish communication between a user interface to computer resources at the second computer and the first computer through the remote display module, and launching an application program and application interception module interface at the first computer to establish communication between the application interception module and the remote display module whereby input/output (I/O) messages are communicated between the application program and the user interface at the second computer.

Preferably, a remote control service publisher (RCSP) server, which is preferably a HTTP server displaying HTML documents, provides information about the application programs available for use and demonstration. The HTML documents retrieved from the RCSP contain tags which may be used by a user at the second computer to send a request for an application program to the RCSP. Browsers, which are well known, are used by the second computer to view HTML documents from the RSCP. In response to an activation request by a user, the RCSP server sends a file containing the executable code for a remote display module (RDM) to the browser. Preferably, the browser includes an interpreter which executes the RDM. This execution opens an application window for the remote display module and the remote display module communicates with the local resource interface in the user's computer. The RDM then sends a request for activation of the requested application program to a remote application server (RAS). The RAS launches the requested application program along with an application interception module (AIM) and/or a protocol translation and optimization module (PTOM). The AIM and/or PTOM converts I/O messages in a first I/O stream protocol for the local resource interface of the computer executing the application program to remote control protocol messages in a remote control protocol. The remote display module being executed by the browser converts the remote control protocol messages it receives from the AIM and/or PTOM to I/O messages in the second I/O protocol for delivery to the local resource interface at the user's computer and converts the user's input captured from the local resource interface in the user's computer to remote control protocol messages in the remote control protocol. These remote control protocol messages are transmitted to the RAS for delivery to the AIM and/or PTOM for conversion to the first I/O protocol.

The application interception module (AIM) monitors the system calls made by the application program to the local resource interface of the first computer. The local resource interface directs the output of the application program to local resources, such as a video display card or sound card, so the program communicates with a user. The AIM intercepts the system calls of the application program to the local resource interface and provides the application program with data from the local resource interface of a remote computer. The data from the remote local resource interface is from input devices such as a mouse or keyboard and is contained within remote control protocol messages. The RAS may also activate a protocol translation and optimization module (PTOM). The PTOM is used to encapsulate messages from AIM in a known remote control protocol within a remote control protocol used for the remote control protocol messages.

Most preferably, the PTOM is used to reduce the latency in the communication time associated with networks. Most Internet users couple to the Internet through a telephone twisted pair line. The bandwidth for this type of communication conduit is relatively narrow. To reduce response times, the PTOM has an associated cache memory in which data about the system in which the RDM is executing are stored. The PTOM parses system calls received from the AIM to determine whether the call is requesting information stored in the cache memory. If the information is stored in the cache memory, the information is retrieved and returned to the application. In this way, the time associated with the transmission of the system call to and the receipt of the response from the RDM is avoided.

Preferably, the RDM of the present invention is implemented in an interpretative language such as the JAVA language. JAVA capable browsers include an interpreter for JAVA language instructions. Thus, an RDM implemented in the JAVA language may be executed by the interpreter in these JAVA capable browsers. When a JAVA capable browser is used, the RDM may be identified in an applet tag of a HTML document. In response to activation of the applet tag, the RCSP may retrieve the identified file containing the executable code for the RDM and transfer the file to the JAVA capable browser. The interpreter in the browser may then execute the transported RDM. Because the RDM is identified as an application program for the user's computer, it is provided with its own communication access to the local resource interface for the user's computer. The RDM may remain active to present output from the application program at the RAS to the RDM at the user's computer and to generate remote control protocol messages corresponding to the user's input actions for transmission to the AIM or PTOM at the RAS. When the demonstration is concluded, the RDM at the user's computer terminates along with its access path to the local resource interface. Likewise, the RAS terminates the application program along with any corresponding AIM and PTOM. This preferred implementation does not require RDMs specifically designed for each possible operating system environment. Instead, the RDM obtains sufficient information from the browser and its communication path to the local resource interface to operate in the user's computer without pre-installation.

Translation of system calls for one type of operating system to another type may be performed by the AIM or PTOM. Alternatively, the system and method of the present invention may maintain a library of RDMs, each of which is designed for a specific operating system environment. In response to a request for a program demonstration, the RCSP selects the file containing the executable code for the RDM for the operating system environment that corresponds to the parameters identified in the request for the program activation received from the user's computer. The file for the RDM is transmitted and executed in the user's computer. The execution of the embedded program results in a communication path to the local resource interface being generated for the RDM. The RDM then interprets the messages generated by the AIM or PTOM at the RAS to provide the user access and control of the application program. This alternative implementation does not require pre-installation, but does require more operating system parameter information to correctly select an RDM to transport to the user's computer.

The system and method of the present invention provides a network user with access and control over an application program so that the user may experience the look and feel of the program as well as try the features of the program. The user need not install any software or directly supply any information about the user's computer system to the server through which application access is possible. Instead, the interface to the application program is transparent to the user and only requires the execution of a RDM on the user's machine. The RDM may be provided and used by the user's computer through the user's browser or through the embedding of a program segment in the user's computer using an HTML document.

These and other advantages and benefits of the present invention are evident to one of ordinary skill in the art from the following detailed description and accompanying drawings.

BRIEF DESCRIPTIONS OF THE DRAWINGS

The accompanying drawings, which are incorporated and constitiute a part of this specification, illustrate embodiments of the invention and, together with the general description given above, and the detailed description of the embodiments given below, serve to explain the principles of the invention.

DETAILED DESCRIPTION OF THE PRESENT INVENTION

Figure 1:
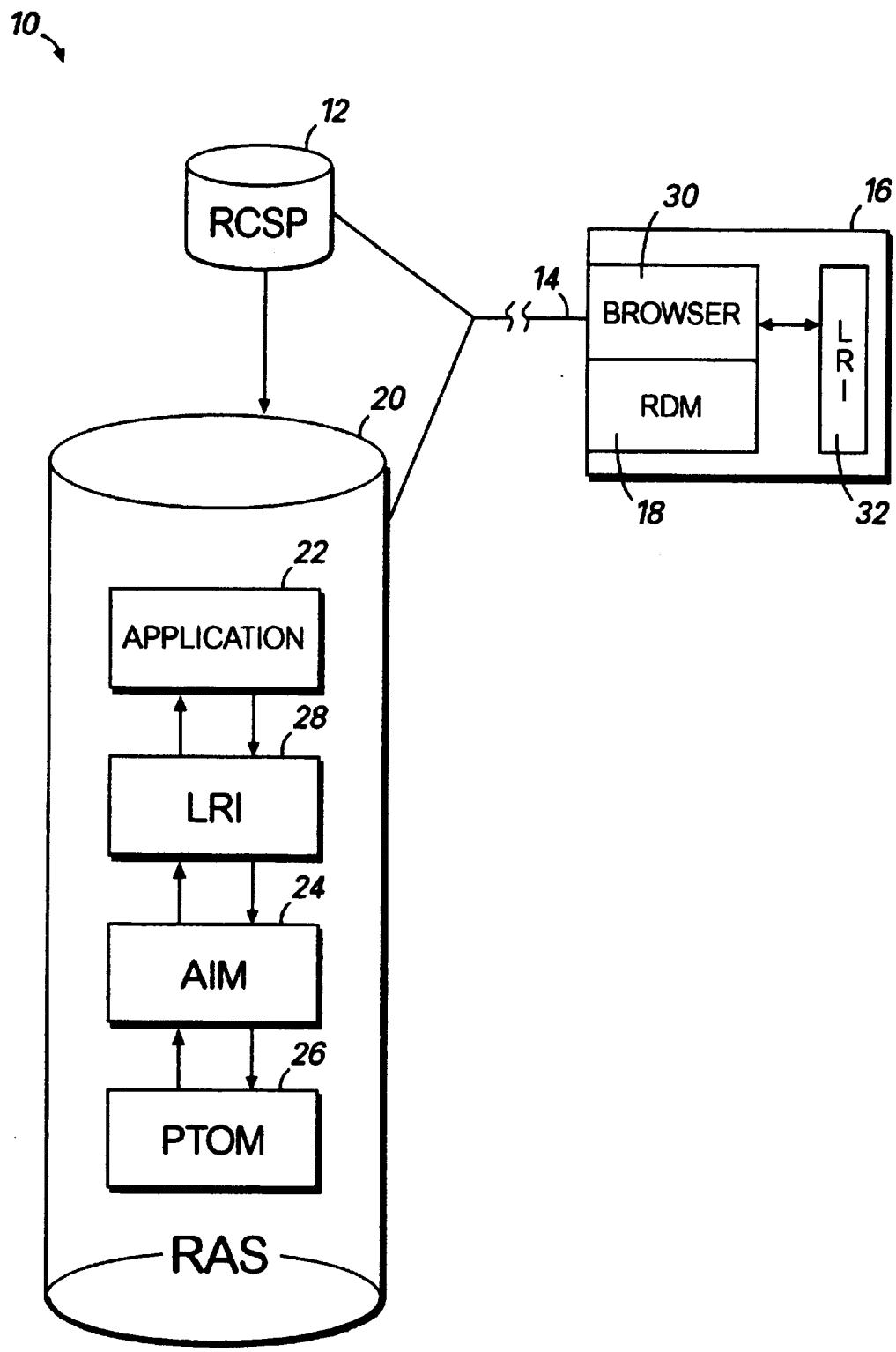
FIG. 1 is a block diagram of a system in which the system and method of the present invention are used to remotely access an application program.

A system in which the principles of the present invention are implemented is shown in FIG. 1. The system 10 includes a remote control service publisher server 12 which is coupled through a network 14 to a user computer 16. User system 16 may be coupled through an access server (not shown) such as that provided by a Internet service provider. Coupled to RCSP 12 and to network 14 is a remote application server (RAS) 20. Remote application server 20 is used to launch an application program 22 with a corresponding application interception module (AIM) 24 in response to a request from user system 16. Normally, application program 22 communicates with local resource interface 28 using system calls having an I/O protocol to provide output to and receive input from the I/O device coupled to the computer on which application program 22 is executing. RAS 20 may also launch a protocol translation and optimization module (PTOM) 26 if AIM 24 encapsulates the I/O stream or system calls of program 22 with a previously known remote protocol or latency problems are expected with the bandwidth of network 14. Either AIM 24 or PTOM 26 communicates with user system 16 through network 14. Remote display module (RDM) 18 is transported from RCSP 12 to user system 16. Once RDM 18 is executing on user system 16, it provides a seamless and transparent interface between the local resource interface of system 16 and application program 22.

User system 16 is typically a personal computer, although other computer platforms may be used. User system 16 communicates with servers over network 14 through a communication program such as browser 30. User system 16 also includes local resource interface 32 which couples application programs on system 16, such as browser 30, to input/output (I/O) devices such as a mouse, keyboard, or monitor. Local resource interface 32 is sometimes called a user interface. Application programs executing on user system 16 communicate with local resource interface 32 using system calls having an I/O protocol. Usually, the I/O protocols of the computer executing application program 22 and user system 16 are different. User system 16 may implement any known operating system such as DOS, DOS with Windows, Windows '95, Unix, O/S 2, or an Apple operating system. The operating system is used to launch application programs within user system 16 which process information and communicate with the user through the devices coupled to local resource interface 32. Browser 30 is a type of application program which is used to convert the user's actions received through local resource interface 32 into commands recognized for retrieval of information over network 14. Likewise, browser 30 converts information retrieved through network 14 into a suitable system calls for displaying the retrieved information through local resource interface 32 to the user. When network 14 is the Internet, browser 30 is preferably capable of communicating over network 14 in the Hypertext Transport Protocol (HTTP). The documents communicated over the Internet are preferably written in Hypertext Markup Language (HTML).

RCSP 12 and RAS 20, for Internet applications, are preferably HTTP servers. That is, the server supports the HTTP communication protocol for presenting and transmitting HTML documents over the Internet. Such servers are well known and may be purchased from such well-known sources as NCSA, NetScape, and CERN. Preferably, RCSP 12 presents HTML documents which describe the application programs available for demonstration through RAS 20. A user at system 16 may retrieve the HTML document using browser 30 and view the contents of the document through local resource interface 32. Preferably, the HTML document displaying the information about a selected application program includes an applet tag field for activating a demonstration of the application program. When a user activates the applet tag field, browser 30 transmits a request for activation of the selected application program along with attributes and parameters describing the operating system environment of system 16. Some exemplary applet tags are:

<APP class="rdm" platform="win31" colordepth="8bit">

<APP class="rdm" platform="macros">

<APP class="rdm" platform="pcxserver" colordepth="mono" transport="winsock">

<APP class="rdm_internet" platform="unix" browser="netscape">

<APP class="rdm_ether" platform="win95" browser="mosaic">

From these exemplary tags, information about user system 16 is provided. For example, the "platform" field may identify the user system 16 as operating under Windows version 3.1, a Macintosh operating system, X server, Unix operating system, or Windows 95. Likewise, the color capability, type of browser, or communication socket may also be identified.

Because the request for a demonstration of an application program results in the launching of an application program which a user at system 16 controls, RCSP may include a security component, such as TCP wrapper available from Wietse Venema of Eindhoven University of Technology, the Netherlands, which parses the attribute and parameter information to ascertain information which may be used to deny access to the application program. In response to an approved request for application activation, RCSP 12 communicates a RDM 18 to browser 30. RAS 20 may reside on the same computer implementing RCSP 12 or it may reside on its own computer platform coupled to RCSP 12 either through a network or dedicated communication line. RAS 20 preferably includes a library of application programs which may be made available for demonstration. RAS 20 may also include additional security components to further scrutinize or interrogate user system 16 for information prior to launching an application for use. For example, RAS 20 may, through RDM 18, interrogate a user for identification and a password prior to providing the user access to an application program. The application programs which RAS 20 launches may be launched on the same computer implementing RAS 20 or RAS 20 may be coupled to a plurality of computers which may be used to launch one or more application programs. Use of a plurality of computers for launching application programs 22 is preferred as each computer may implement a different operating system environment so that a user may select an application program which executes under an operating system similar to the one on the user's system. Alternatively, AIM 24 or PTOM 26 may be used to translate system calls compatible with the operating system on a computer executing application program 22 to system calls compatible with the operating system on a user's system.

RAS 20 launches application programs 22 in an appropriate operating system environment, whether it is on the computer implementing RAS 20 or one coupled to RAS 20. Each application program 22 has a corresponding AIM 24 for communicating with the local resource interface 28 for the computer executing application program 22. Application interception module 24 of the present invention captures the I/O stream or system calls between application program 22 and the local resource interface 28 and converts it to a remote control message in a remote control protocol. For output generated by application program 22, the remote control protocol messages are provided to browser 30 of user system 16 for processing in a manner to be discussed more fully below. PTOM 26 is launched by RAS 20. AIM 24 uses a known remote protocol not recognized by RDM 18 or the bandwidth of network 14 may cause latency problems. In the first situation, PTOM 26 encapsulates the known remote control protocol messages in the remote control protocol recognized by RDM 18. In the second case, PTOM 26 allocates a portion of memory as a cache memory 30 to improve communication turnaround.

Figure 2:
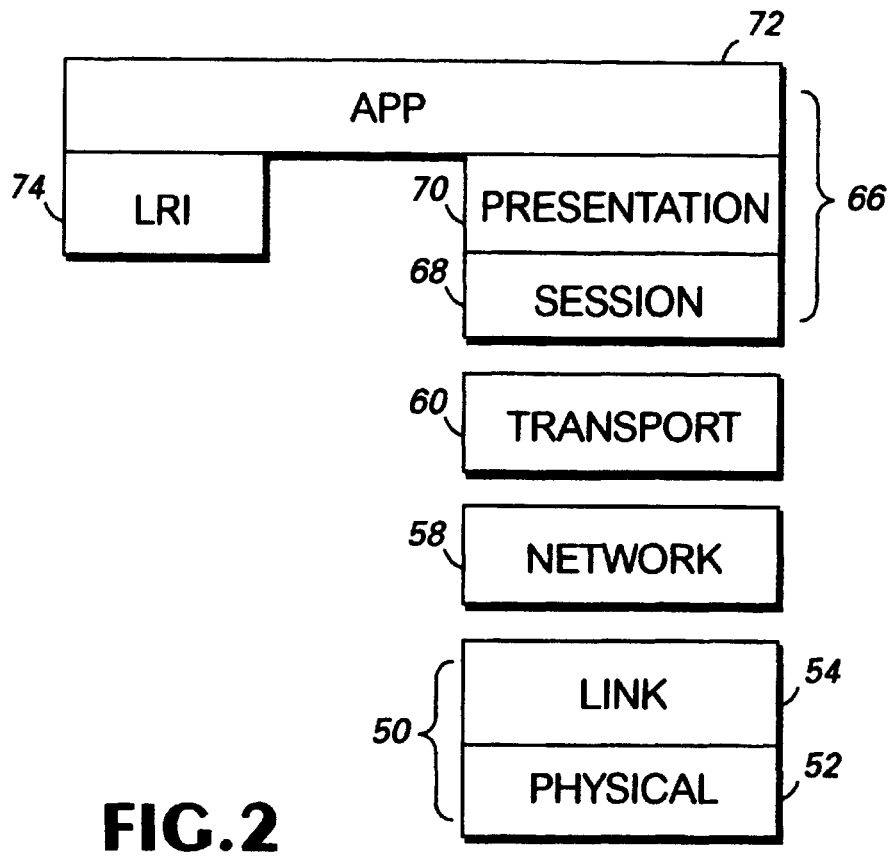
FIG. 2 is a schematic depiction of the communication layers present in a network environment for an application program.

An exemplary diagram of the layers and components comprising each layer for communication between an application program launched by RAS 20 and a browser 30 at user system 16 is shown in FIG. 2. The lowest layer is the link layer 50 which is comprised of the physical hardware and the datalink processing. The physical component 52 is the actual hardware for communicating a binary bit stream over a network. Datalink 54 is the processing to organize the binary bit stream into frames of data for processing by network layer 58. Network layer 58 includes the processing of the frame data to deliver data units to the transport layer of a specified computer. Common network processing includes routing and other network traffic management. Transport layer 60 communicates delivered data units to the correct application layer within the specified computer. For outgoing data, the transport layer provides sufficient information for the identification of the application layer in the receiving computer. In Internet applications, the network layer uses the Internet protocol (IP) and the transport layer uses the Transport Communication Protocol (TCP). Hence, the Internet is frequently referred to as a TCP/IP network since these are the two protocols used to communicate between application programs and the network hardware.

Application layer 66 is typically comprised of a session component 68, presentation layer 70 and the application program 72. Session component 68 typically includes software for processing the interface between a particular user and the application program. In effect, the session layer is the gateway for a user on the network to the application program. The presentation layer is the interface between the application program and the network interface for network I/O operations. Local resource interface 74 is the interface between an application program and its corresponding I/O components or graphical user interface (GUI) on the computer executing the application program. In the present invention, the I/O stream between application program 72 and local resource interface 74 must be captured and communicated to the presentation layer to transport it across network 14 to another computer, such as user system 16. Heretofore, the capturing of such an I/O stream for delivery to another application program has only been possible if the program for capturing and delivering the I/O stream at each computer was installed in both computers prior to opening the communication between both computers. The system and method of the present invention permit a first computer to initiate communication with a second computer, transport the program component which supports remote control between the two computers, activate the program component and remotely control an application program at the second computer. This on-demand availability of remote control over another computer has been heretofore unknown.

The advantages of the present invention are made possible by a remote display module 18 which is transported from RCSP 12 to user system 16 prior to the launching of application 22 by RAS 20. Although other systems are known for transporting I/O streams across a network, these systems suffer from the limitations that a component must be installed in a user's system prior to initiation of the communication for supporting the remote control session. For example, a protocol known as the X protocol is used for remote computing across a network. The X protocol captures an I/O stream between a local resource interface and an application program and encapsulates it in the transport and network protocol for a network. The X protocol defines which computer on the network receives the I/O stream even when the local resource interface of the computer receiving the I/O stream is the same one in which the stream was generated. However, for the X protocol to be functional, a X protocol server must be installed by the user at each computer on the network in order to enable the computer to receive an I/O stream from another computer over the network.

In the present invention, there is no user installation of a remote control component prior to initiating the remote control session. Instead, RCSP 12, after approving access to an application program 22, selects a corresponding remote display module 18. This remote display module is communicated through network 14 to browser 30 within user system 16. Preferably, the executable code for the RDM, which is preferably written in JAVA language, is transported in a file across network 14 to browser 30 so browser 30 may execute RDM 18 with its internal interpreter. Execution of RDM 18 by the browser interpreter opens an application window for RDM 18. In this way, browser 30 opens communication between RDM 18 and local resource interface 32 to provide user input actions to RDM 18 and through which RDM 18 may provide output to local resource interface 32. The transporting of the RDM 18 across the network to the browser for execution does not require any information other than the identification of the operating system environment for user system 16 which may be supplied through the applet tag of a HTML document. This operating system environment identification is used to select a RDM which best corresponds to the operating system environment. Specific system parameters required for interfacing with local resource interface 32 are not required since they are provided by browser 30. Thus, RDM 18 of the present invention takes advantage of and supplements the structure present in a JAVA capable browser to provide seamless and transparent control over an application program 22 launched by RAS 20.

While browser 30 preferably supports the JAVA language to take advantage of the interpreter provided within such a browser, other browser implementations may be used to execute an RDM of the present invention. For example, a SAFETcl browser may utilize a mailcap entry to implement a RDM. The mailcap entry correlates the transported RDM to a file type in the operating system environment of user system 16. This correlation information may be used to launch RDM 18 with its own application window so it may communicate with local resource interface 32 in user system 16. Other schemes within the principles of the present invention may also be utilized. For example, information about the operating system environment for a user system 16 may be provided by a browser 30 in a Universal Resource Locator (URL) to RCSP 12 for selection of a corresponding RDM 18. This information may also be provided in a tag for an extended HTML document. While these implementations are in accordance with the principles of the present invention in that no user installation of a RDM is required, these implementations are designed for specific environments and require more information for implementation than the above-identified approach used with a JAVA capable browser.

The system and the method of the present invention may be used to support the remote control of more than one application program. For example, RAS 20 may launch an application program and corresponding AIM 24 and PTOM 26 on one computer and, in response to another request from a second user, launch a second application program with its corresponding AIM and PTOM. As long as the communication capability of the communication server coupling both computers to the network provides messages to and from the AIMs and PTOMs for the respective applications in a timely manner, the operation of the system and method of the present invention remains the same.

AIM 24 is typically implemented by replacing a component of the operating system or a component of application program 22. Known application programs written for the Windows environment execute system calls to the local resource interface drivers for various devices or computer resources such as the video system, keyboard, or mouse. To implement the present invention, AIM 24 traps the system calls to local resource interface 28 so the data stream being written to or received from the interface may be captured. AIM 24 then converts the I/O stream or system calls directed to local resource interface 28 to remote control protocol messages in a remote control protocol. The remote control protocol messages are then encapsulated in the transport, network and link layer protocols for transporting over the network to RDM 18 within user system 16. RDM 18 converts these remote control protocol messages to appropriate applications calls for local resource interface 32 at user system 16. In response to the output generated by the system calls to local resource interface 32, a user usually provides data through an input device through local resource interface 32. RDM 18 captures the system calls from local resource interface 32 generated by the user's response and converts them to remote control protocol messages in the remote control protocol which are likewise encapsulated in transport, network and link layer protocols for transporting across the network to AIM 24. AIM 24 then converts the remote control protocol messages to system calls for local resource interface 28. In this way, output from application program 22 is directed to the local resources available on user system 16 and user input actions at user system 16 are provided to application program 22.

PTOM 26 is launched by RAS 20 when AIM 24 includes the capability of encapsulating an I/O stream in transport and network protocols. For example, if the application program is written for the X protocol, AIM 24 already includes the encapsulation of the I/O stream or system calls in the transport and network protocols. Even if the I/O stream is directed to the local resource interface in the computer executing application program 22, it is encapsulated and decapsulated within the computer prior to being delivered to local resource interface 28 for the computer executing application program 22. Although this adds overhead to the processing of the I/O stream for I/O operations within the computer executing application program 22, it provides a general scheme which supports the transporting of the I/O stream across a network. PTOM 26 is implemented to permit AIM 24 to operate without modification for an X protocol or other known remote protocol. Instead, PTOM 26 takes the encapsulated output of AIM 24 and converts it to remote control protocol messages in the remote control protocol. PTOM 26 also converts remote control protocol messages from RDM 18 to encapsulated I/O streams for delivery to AIM 24. When the operating system environment for user system 16 and the computer executing application program 22 are not the same, PTOM 26 optimizes the conversion of the system calls in one system to system calls in the other system.

For example, because RDM 18 is being executed by browser 30, it may interrogate browser 30 to obtain parameters regarding the video system of user system 16. These parameters include the pixel size of the monitor screen, the color palettes for the screen, and the fonts supported by the system. These parameters are transmitted to AIM 24 or PTOM 26 for use. Whenever an system call from application program 22 is intercepted and provided to AIM 24 or PTOM 26 for conversion to the remote control protocol, the parameters for user system 16 are used. For example, if the system call is to a library routine for drawing a line, AIM 24 or PTOM 26 converts the parameters for drawing the line so they correspond to the library routine on user system 16 and correspond to the pixel resolution of the screen. In this manner, the user at system 16 views the operation of the application program in a seamless fashion even though the local resource interfacing at program 22 and user system are different.

PTOM 26 is required to support the display model for which AIM 24 is designed. That is the system calls and parameters within those calls used by AIM 24 to drive a display and receive input must be anticipated by PTOM 26 in order to be able to convert the system calls received from AIM 24 to remote control protocol messages. The design of the display which AIM expects may be called the logical display model for AIM 24. Likewise, RDM 18 conforms its system calls and corresponding parameters to a logical display model implemented for it. Thus, PTOM 26 must be designed to map the system calls and parameters for the logical display model of AIM 24 to the system calls and parameters for the logical display model of RDM 18. If the system calls or parameters for AIM 24 have corresponding system calls and parameters in RDM 18, a case statement for directly mapping the system calls and parameters for AIM 24 to RDM 18 may be implemented in PTOM 26. In this situation, RDM 18 may also include a direct mapping of the system calls and parameters for its logical display model to the corresponding system calls and parameters for the logical display model of AIM 24.

Where components of the logical display model for AIM 24 do not have a corresponding element in the logical display model of RDM 18, PTOM 26 must simulate the logical display model for AIM 24. That is, PTOM 26 must generate responses or provide data parameters to AIM 24 which conform to the logical display model for AIM 24. Any changes which should be reflected in the output at user system 16 must be provided in remote control protocol messages to RDM 18. This may be achieved, for example, by having PTOM 26 maintain a binary image of the output display or graphical user interface (GUI) at user system 16. Changes made to this image as a result of system calls from AIM 24 which do correspond to an system call in RDM 18 are encapsulated for transport to and displayed at user system 16.

Figure 3:
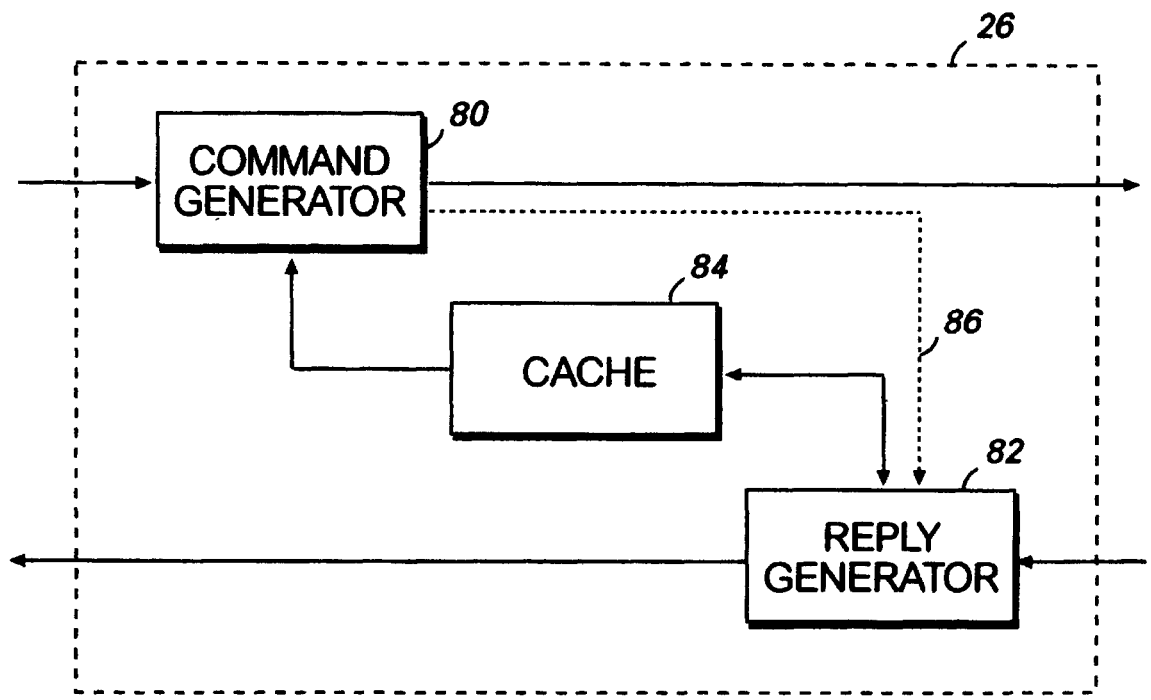
FIG. 3 is a block diagram of a protocol translation and optimization module (PTOM) shown in FIG. 1.

A block diagram of PTOM 26 is shown in FIG. 3. As shown in the Fig., PTOM 26 includes a command generator 80, a reply-generator 82 and a cache memory 84. The system calls and parameters from AIM 24 may be considered commands and are typically of three types. These are display instruction commands, status query commands, and attribute commands. Display instruction commands are instructions from AIM 24 to its logical display model which change the display being viewed by a user. Because the attributes of the computer on which application program 22 is executing and user system 16 may differ, the system call or parameters of a call which change a display may need modification prior to be sent to RDM 18. Attributes are hardware characteristics such as window types, color encoding schemes, and fonts supported, for example. If the attribute of the AIM logical display model corresponds to an attribute in the RDM logical display model, a direct mapping to the corresponding system call may be used. If the attribute does not have a corresponding attribute, PTOM 26 may keep a corresponding bit image of the display or GUI in memory, update it in accordance with the display instruction command, and send the changed portion in a remote control message to RDM 18.

A second type of command from AIM 24 is a status query command. This type of command is used to obtain the characteristics of a display or GUI or the attribute settings of a computer. If the characteristic or attribute being queried has a corresponding attribute or characteristic in RDM 18, a direct mapping is used to generate the remote control message to RDM 18 requesting the corresponding attribute or characteristic. Otherwise, PTOM 26 simulates a response consistent with the logical display model of AIM 24. To reduce communication latency, PTOM 26 may search cache memory 84 to determine if the attribute or characteristic has been received from RDM 18 before. If it has and it is stored in cache 84, command generator 80 signals reply generator 82 of PTOM 26 to retrieve it and incorporate it in a reply to AIM 24.

The third type of command is an attribute command. This type of command is used to set the attributes of a computer. Again, a direct mapping may be used if the attribute being set by the command has a corresponding attribute in RDM 18. If PTOM 26 simulates the attribute, its status is updated in PTOM 26.

Reply remote control protocol messages may be of five types—user input events, device characteristics, device errors, display model errors, and attribute status replies. Most user input events from RDM 18 are capable of direct mapping to a corresponding event in the logical display model for AIM 24. Events not supported by AIM 24 are ignored. PTOM 26 may process user events to prevent security breaches in the computer executing application program 22.

Device characteristic and attribute status replies usually are directly mapped to a reply AIM message since command generator 80 of PTOM 26 only generates remote control protocol messages for attributes and characteristics in RDM 18 that correspond to AIM 24. If either type of reply is received which does not correspond to an attribute or characteristic in AIM 24, it is ignored. Preferably, the characteristics and attributes received from RDM 18 are also stored in cache 84 for responding to status query commands without requiring a message to be sent to RDM 18. Preferably, attributes and characteristics which conform to the logical display model for AIM 24 have allocated locations in cache memory 84 to facilitate their retrieval.

Device errors indicate that a system error occurred at user system 16. PTOM 26 may terminate the remote session in response or it may pass a corresponding error message to AIM 24, if one can be mapped. Preferably, application program 22 or PTOM 26 generates a display instruction command to inform the user of the error. Otherwise, the user does not understand the unresponsiveness of application program 22 or its termination. Display model errors occur in response to compatibility errors between the logical display models for AIM 24 and PTOM 26. Preferably, PTOM 26 stores such replies in a log for later analysis.

Figure 4A:
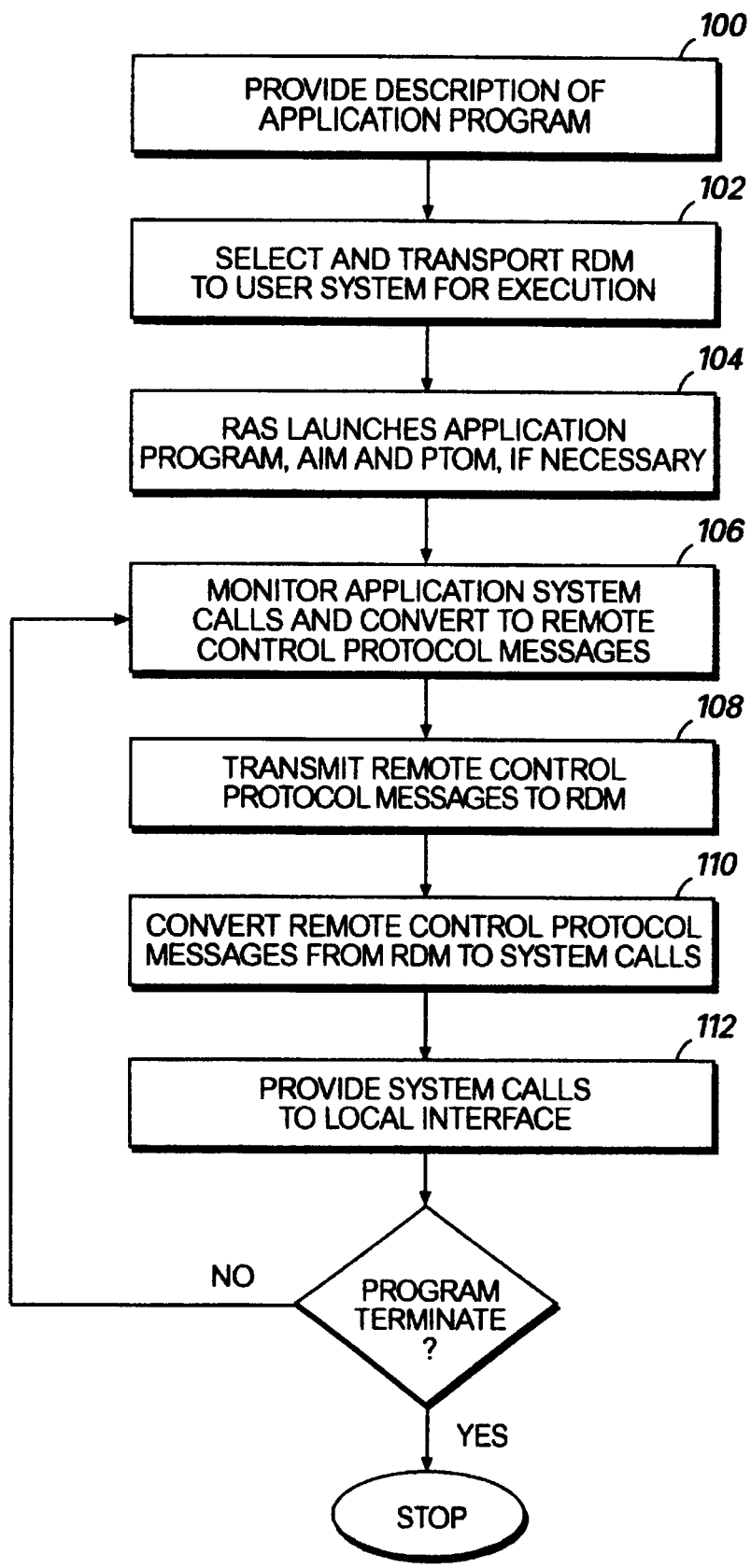
FIG. 4A is a flow chart of the process for providing remote control access to a user over a network.

A method for the remote control of an application program in accordance with the principles of the present invention is shown in FIG. 4A. The method begins by the presentation of a document describing an application program to a browser at a user's system (Block 100). In response to a user's request for activation of an application program, RCSP 12 selects a RDM 18 which corresponds to the parameter and attribute information provided in the application program request (Block 102). The selected RDM 18 is transported across the network to the browser in user system 16 and browser 30 launches RDM 18 to establish communication with local resource interface 32. RAS 20 also launches the requested application program 22 and any corresponding AIM 24 and PTOM 26, if necessary (Block 104). The computer executing the requested application program and user system 16 may now communicate over network 14 with one another.

The method of FIG. 4A continues by monitoring the application program calls to its local interface or alternatively, monitoring the output of AIM 24 for the encapsulated I/O streams. If application program 22 generates low level I/O calls, AIM 24 converts the I/O streams for the application program's local resource interface 28 into remote control protocol messages (Block 106). These remote control interface messages are then transported across network 14 to RDM 18 executing in user system 16 (Block 108). RDM 18 converts the remote control protocol messages to system calls for the local resource interface 32.

RDM 18 also monitors calls to the local resource interface 32 by input devices and converts the information in the system calls to remote control protocol statements for encapsulation in the transport, network and link layer protocols by browser 30 for transporting across network 14 to AIM 24. AIM 24 then converts the remote control protocol messages to system calls for application program 22 (Block 110, 112). The conversion between the I/O protocol for the application program 22 and remote control protocol continues until the program terminates.

Figure 4B:
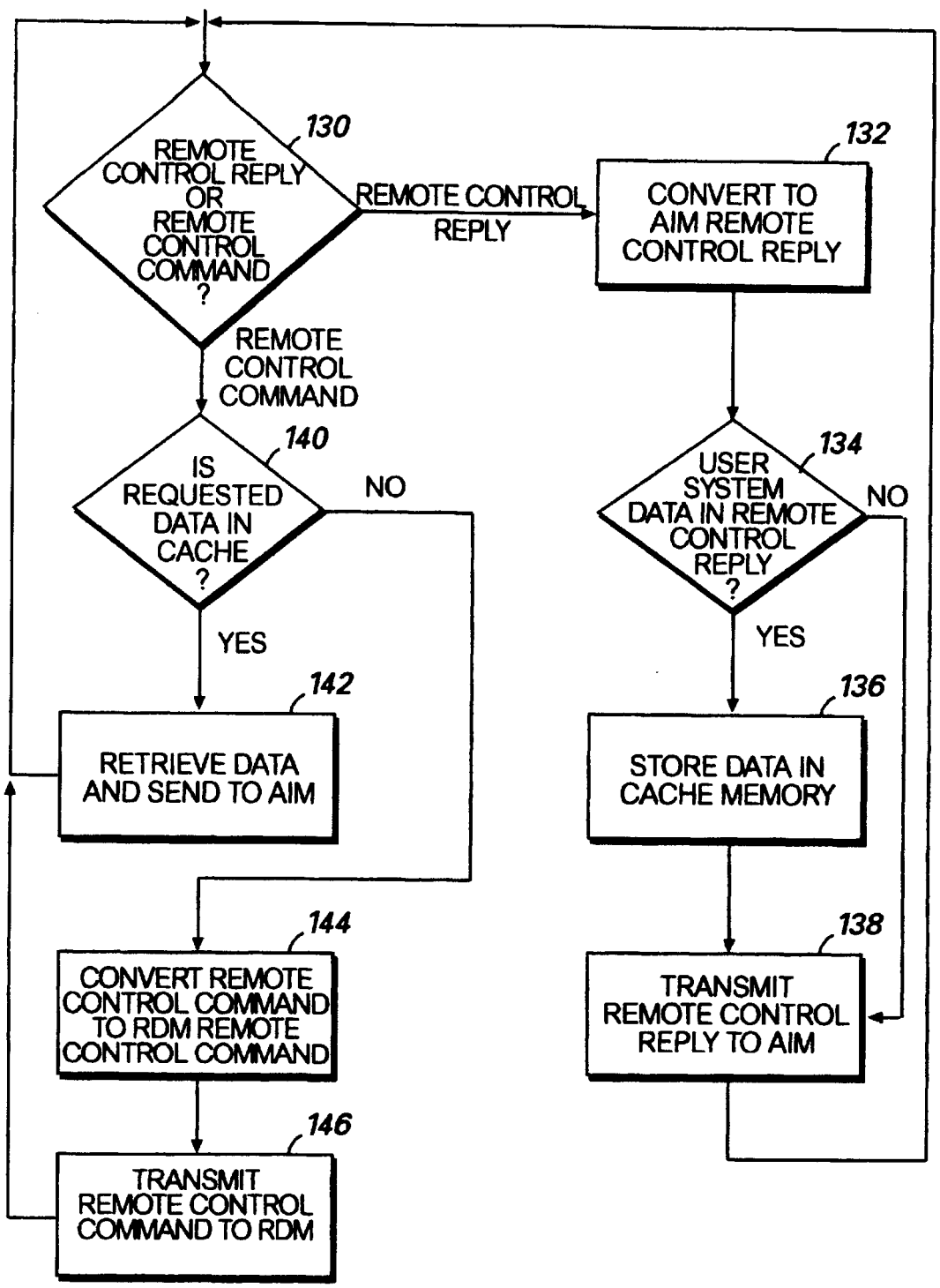
FIG. 4B is a flow chart of the process performed by a PTOM to reduce latency in communication over a network.

If PTOM 26 is launched with application program 22, it performs the method shown in FIG. 4B. That method begins by determining whether the message to be processed is a remote control reply or a remote control command message (Block 130). If the message is a remote control reply message, it is converted to an AIM reply for the application program (Block 132). If the remote control reply message contains attribute or characteristic information about user system 16 (Block 134), the data are stored in cache memory 84 (Block 136). The AIM reply is then converted to a system call for local resource interface 32 by AIM 24 (Block 138). If the message is a remote control command message, PTOM 20 determines if a parameter stored in the cache memory is being requested (Block 140). If it is, reply generator 82 retrieves the data from cache 84 and builds an AIM reply message (Block 142). Otherwise, the command messages are converted to the remote control protocol (Block 144) and are transmitted across network 14 to user system 16 (Block 146). PTOM 26 continues to convert between the encapsulated system calls and the remote control protocol until the user terminates the application program.

In use, after installation of a browser, a user need not install additional software or provide additional parameters for the remote control of an application program. Instead, a user browses the Internet and, if the site browsed is an RCSP, the user selects the application program. The RCSP transports an RDM to the user system for execution and the RAS launches an application program in response to a request from the RDM. The RDM then converts I/O streams for transporting to the application program launched by the RAS and the AIM or PTOM corresponding to the launched application program provides converted I/O streams to RDM 18. In this way, communication of input and output operations are communicated between the application program and the user system.

While the present invention has been illustrated by a description of various embodiments and processes, and while the embodiments and processes have been described in considerable detail, it is not the intention of the applicant to restrict or in any way limit the scope of the appended claims to such detail. Additional advantages and modifications will readily appear to those skilled in the art.

What is claimed:

1. A system for on demand remote control of an application program comprising:

an application interception module (AIM) for converting between a first input/output (I/O) stream protocol used by an application program and a first remote control protocol, the I/O stream protocol being used to interface the application program to local resources on a first computer; and a remote display module (RDM) for converting between said first remote control protocol and a second I/O stream protocol, said second I/O stream protocol for communicating with local resources for a second computer through a user interface, the remote display module being transported from said first computer to said second computer for execution by said second computer upon receipt whereby a user at said second computer may establish on-demand remote control of the application program on the first computer to provide input to and view output from the application program at said first computer.

2. The system of claim 1 further comprising:

a remote control service publisher (RCSP) server for selecting and transporting said remote display module in response to a user request for an application program.

3. The system of claim 2 further comprising:

a remote application server (RAS), said remote application server selecting an application program and corresponding AIM for activation in response to a request for activation of an application program from said remote display module, said AIM corresponding to said selected application program communicating remote control protocol messages in said remote control protocol with said remote display module.

4. The system of claim 1 wherein said remote display module is executed by an interpreter in said second system to open an application window for said remote display module in said second computer system.

5. The system of claim 3 further comprising:

a browser at said second computer, said browser communicating with said RCSP to select and receive said remote display module corresponding to said requested application program.

6. The system of claim 5 said browser further comprising:

an interpreter for executing said remote display module received from said RAS.

7. The system of claim 1 further comprising:

a protocol translation and optimization module (PTOM) for converting an I/O stream encapsulated in a second remote control protocol communicated between said PTOM and said AIM to said first remote control protocol.

8. The system of claim 6 wherein said RCSP is a HTTP server and said remote display module is transported across a network to said second computer.

9. The system of claim 8 wherein said remote display module is transported across said network in response to activation of an applet tag of a HTML document.

10. The system of claim 1 further comprising:

a PTOM for reducing communication latency between said first and said second computers; and a cache memory coupled to said PTOM, said PTOM retrieving data about said second computer from remote control protocol messages from said RDM and storing said data in said cache memory so that said data about said second computer may be communicated to said AIM in response to system calls received from said AIM whereby transmission of said system calls to said second computer are avoided.

11. A method for providing on demand remote control of an application program comprising the steps of:

transporting a remote display module from a first computer to a second computer;

executing said remote display module at said second computer to establish communication between a user interface to computer resources at said second computer and said first computer through said remote display module; and launching an application program and application interception module at said first computer to establish communication between said application interception module and said remote display module whereby input/output (I/O) messages are communicated between said application program and said user interface at said second computer.

12. The method of claim 11 wherein said remote display module is transported in an applet file.

13. The method of claim 12 wherein said remote display module is transported in response to activation of an applet tag of a HTML document.

14. The method of claim 11 wherein said remote display module is executed by an interpreter at said second computer.

15. The method of claim 11 further comprising the steps of:

converting I/O messages from said application program to remote control protocol messages for transmission to said remote display module at said second computer; and converting remote control protocol messages received from said application interception module to I/O messages for said user interface at said second computer.

16. The method of claim 15 further comprising the steps of:

converting I/O messages from said user interface to remote control protocol messages for transmission to said application interception module; and converting remote control protocol messages from said remote display module to I/O messages for said application program.

17. The method of claim 11 further comprising the steps of:

storing in a cache memory attribute data from remote control protocol messages received from said remote display module; and retrieving a portion of said attribute data from said cache memory in response to an I/O message from said application program requesting said attribute data.

18. A method for providing on demand remote control of an application program, comprising the steps of:

determining that a user at a first computer system desires remote control over an application at a second computer system;

transporting over said network a remote control module to said second computer when demanded by said user, said remote control module enabling said first and second computer system to communicate remotely without pre-installing remote control software at said second computer prior to opening a communication session between the first and second computer; and executing said remote control module at said second computer to establish a remote control communication between a user interface at said first computer and an application at said second computer.

* * * * *

UNITED STATES PATENT AND TRADEMARK OFFICE
CERTIFICATE OF CORRECTION

PATENT NO. : 5,909,545
DATED : June 1, 1999
INVENTOR(S) : Frese, II et al

It is certified that error appears in the above-identified patent and that said Letters Patent is hereby corrected as shown below:

In Column 16 Line 51 change the word "said" to "a".

Signed and Sealed this

Twenty-eighth Day of November, 2000

Attest:

Attesting Officer

Q. TODD DICKINSON
Director of Patents and Trademarks